(12) United States Patent
Eck et al.

(10) Patent No.: US 6,450,736 B1
(45) Date of Patent: Sep. 17, 2002

(54) MOVABLE SUPPORTS FOR PIPELINES

(75) Inventors: Daniel J. Eck, Anchorage, AL (US);
Gregory R. Ruschau, Delaware, OH (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/844,380

(22) Filed: Apr. 27, 2001

(51) Int. Cl.$^7$ .................................................. F16L 3/16
(52) U.S. Cl. ...................... 405/184.4; 248/62; 248/55; 248/49; 138/106
(58) Field of Search .................... 405/184.4, 157, 405/171, 172; 248/74.3, 55, 49, 76, 62; 239/723, 743; 138/106

(56) References Cited

U.S. PATENT DOCUMENTS

| | | | | |
|---|---|---|---|---|
| 738,271 A | * | 9/1903 | Aste ........................... 239/723 |
| 1,079,758 A | * | 11/1913 | Gray | |
| 3,143,172 A | * | 8/1964 | Wakefield, Jr. ............. 166/352 |
| 3,563,503 A | * | 2/1971 | Lancaster ................... 138/101 |
| 3,699,690 A | * | 10/1972 | Watter ........................ 138/105 |
| 3,734,138 A | * | 5/1973 | Brown et al. ............... 138/106 |
| 4,003,210 A | * | 1/1977 | Bostroem ................... 138/149 |
| 4,128,219 A | * | 12/1978 | Kaigler et al. ................ 248/49 |
| 4,140,292 A | * | 2/1979 | Kaigler, Jr. ................... 248/49 |
| 4,323,088 A | * | 4/1982 | McClellan .................. 138/106 |
| 4,560,125 A | * | 12/1985 | Hess ............................ 248/49 |
| 5,028,149 A | * | 7/1991 | Hardtke ...................... 138/107 |
| 5,743,302 A | * | 4/1998 | McNeely .................... 138/108 |
| 5,927,619 A | * | 7/1999 | Newbill ......................... 188/6 |

FOREIGN PATENT DOCUMENTS

| | | | | |
|---|---|---|---|---|
| DE | 3302573 A1 | * | 8/1983 | ............ H02G/3/18 |
| EP | 0343084 A1 | * | 5/1989 | ............ F16L/3/18 |
| EP | 0448964 A1 | * | 2/1991 | ............ F16L/3/10 |
| WO | WO 89/11614 | * | 11/1989 | ............ F16J/3/16 |

* cited by examiner

*Primary Examiner*—Heather Shackelford
*Assistant Examiner*—Katherine Mitchell
(74) *Attorney, Agent, or Firm*—Drude Faulconer

(57) ABSTRACT

A pipeline supported by a plurality of spaced, movable supports. The supports are not anchored but are movable with respect to the surface of the earth (e.g. tundra) thereby allowing the pipeline to move in response to temperature/pressure changes in said pipe. The supports are sized so that the pipeline will be elevated above the surface of the tundra at a height sufficient to allow water to flow under the pipeline as well as allowing small animals to pass thereunder. The movable supports may be either rolling supports which lie directly on the surface or sliding supports which are positioned on slidable stands or combination of both.

8 Claims, 3 Drawing Sheets

MOVABLE SUPPORTS FOR PIPELINES

DESCRIPTION

Technical Field

The present invention relates to supports for pipelines and in one aspect relates to movable supports spaced along a pipeline wherein the supports are laid on the ground to elevate the pipeline so that water or small wildlife can readily pass thereunder but at the same time allow the pipeline to move freely in response to thermal expansion/contraction or pressure surges.

BACKGROUND

The concept of laying a flexible pipeline directly on the ground in a remote area (e.g. on tundra in arctic regions) is attractive in that it has several inherent advantages. First, the cost of trenching and burying the line or supporting the pipeline above the ground on "permanent" pilings or supports is eliminated. Second, access to a pipeline lying directly on the ground is very easy since no digging or scaffolding is required when maintenance is required. Finally, the pipeline can be moved or removed much easier and at much less expense than a line that is buried or elevated on permanent pilings while, at the same time, causing much less damage to the existing environment.

Unfortunately, however, there are some disadvantages in laying a pipeline directly on the ground. For example, during rainy weather or a spring thaw, the pipeline functions as an artificial dam, creating a small "river" along the pipeline right of way which, in turn, can cause serious erosion problems. Also, due to the size of some pipelines, certain small animals may have trouble crossing the lines.

In order to provide ready access to a pipeline and at the same time allow water and small wildlife (e.g. molting birds, etc.) to readily pass under the pipeline, it has been proposed to support the pipeline on spaced, low-profile supports such as railroad ties or the like. However, this type of support is not free to move with the pipe if and when the pipe undergoes movement (e.g. temperature expansion/contraction, pressure surges, etc.) during operation. This rubbing of the pipe against the support can lead to serious damage to the surface (e.g. tundra) under the support as well as possible damage to the pipeline, itself. Further, "railroad-tie" types of support may be difficult to install in extremely remote or rugged terrain since they normally require a wide, flat area to be effective.

SUMMARY OF THE INVENTION

The present invention provides a pipeline for conveying fluids which is comprised of a length of pipe which is supported by a plurality of movable supports which, in turn, are positioned around said pipeline at spaced intervals along the pipeline. The supports are movable with respect to the surface of the earth (e.g. tundra) thereby allowing said pipeline to move in response to temperature/pressure changes in said pipe. The supports are sized so that the pipeline will be elevated above the surface of the tundra at a height sufficient to allow water to flow under the pipeline as well as allowing small animals to pass thereunder.

More specifically, the movable supports may be rolling supports or sliding supports or preferably a combination of both. A rolling support in accordance with the present invention is comprised of a cylindrical shell which has a central bore therethrough which, in turn, is adapted to receive the pipe. The diameter of the central bore is larger than the outside diameter of the pipe whereby the pipeline is free to move longitudinally within the cylindrical shell. Preferably, the cylindrical shell is comprised of two substantially identical halves (e.g. formed from a plastic material) which are adapted to be secured together after they have been positioned around the pipe. One half of the cylindrical shell is adapted to lie directly on the ground after it has been assembled onto the pipeline.

Each sliding supports of the present invention is comprised of a slidable stand which, in turn, is comprised a saucer-like, partial-spherical base which is adapted to be positioned in movable contact with said surface of the tundra. A plurality of vertical members are affixed to the base and extending upward therefrom. A cylindrical shell, similar to that of a rolling support is positioned on and supported on the vertical members whereby the cylindrical shell will move with said base. Again, the cylindrical shell is comprised of two substantially identical halves which have a central bore therethrough when assembled in which the pipeline is received. The diameter of said central bore is substantially equal to the outside diameter of the pipe whereby the pipeline will be clamped within said central bore when said halves of said cylindrical shell are assembled around said pipe. This tight fit prevents the pipe from moving longitudinally with respect to said cylindrical shell.

In constructing the pipeline, a plurality of the movable supports are spaced along the length of the line. Since the supports are not anchored to the surface, they are free to move in response to any pressure surges in the line or any expansion/contraction of the pipeline due to temperature changes. The rolling supports will "roll" across the tundra while the sliding supports will "slide" and/or "rock" in response to any significant changes in the pipeline thereby substantially elimination any possible damage to either the pipeline or the tundra.

BRIEF DESCRIPTION OF THE DRAWINGS

The actual construction, operation, and apparent advantages of the present invention will be better understood by referring to the drawings which are not necessarily to scale and in which like numerals identify like parts and in which.

BEST KNOWN MODE FOR CARRYING OUT THE INVENTION

Figure 1:
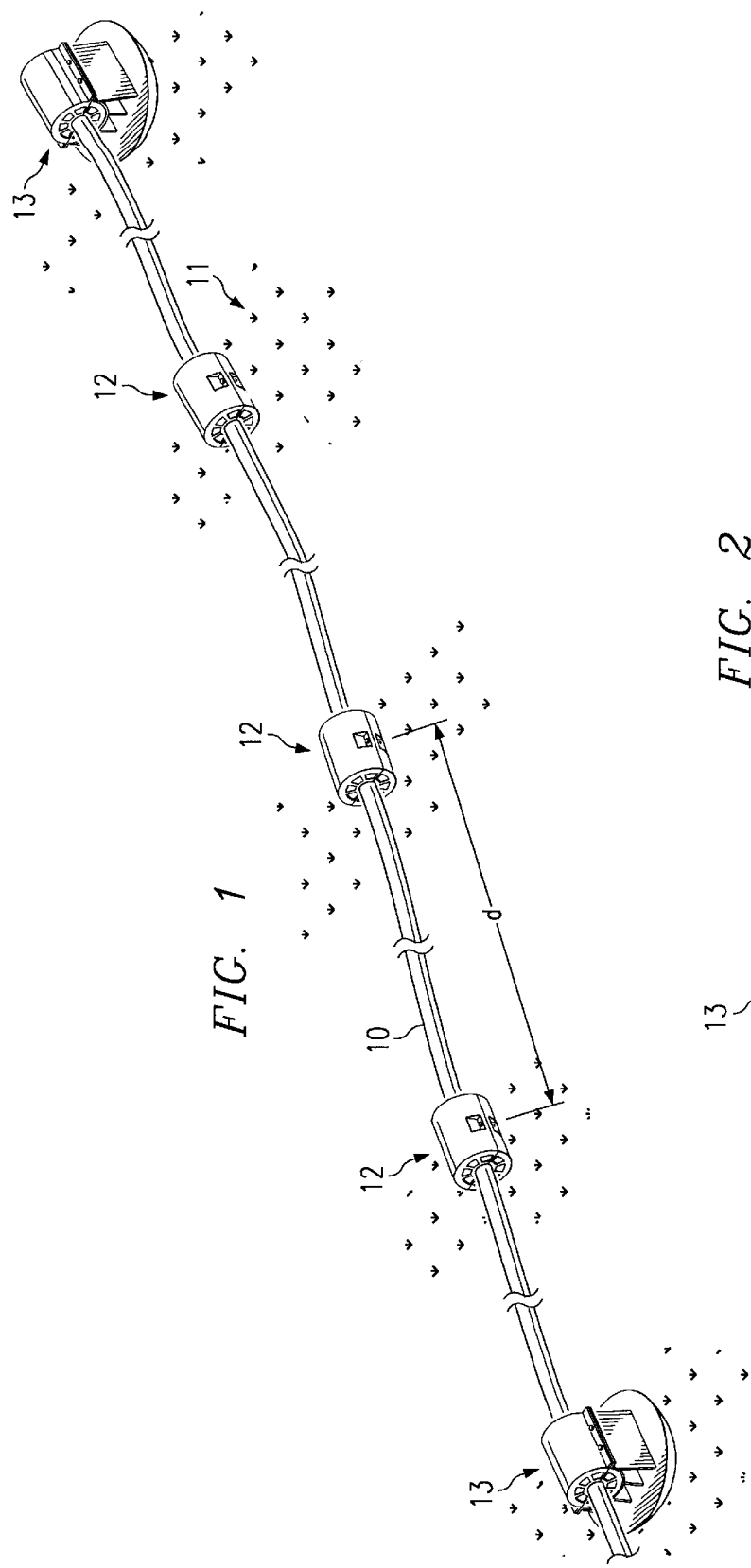
FIG. 1 is a perspective view of a section of pipeline having the supports of the present invention installed thereon.
Figure 2:
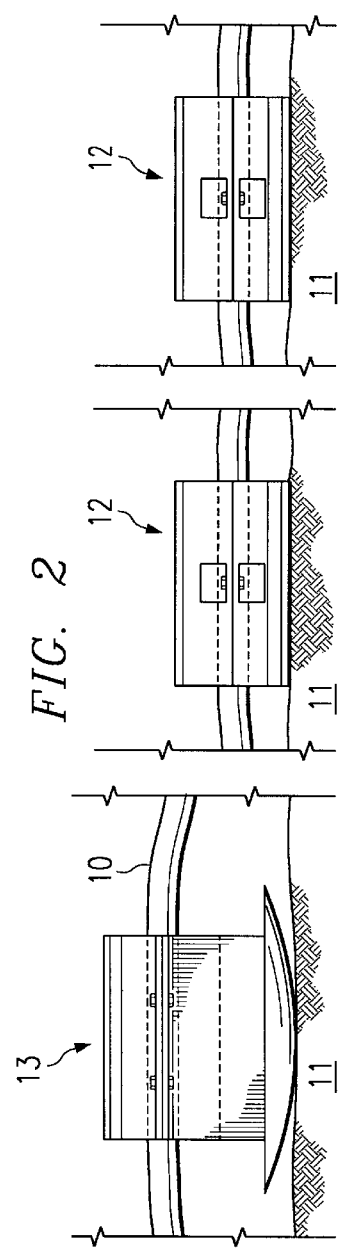
FIG. 2 is a side view of a portion of the pipeline of FIG. 1.

Referring more particularly to the drawings, FIG. 1 illustrates a length of pipeline 10 which is effectively laid directly onto the surface of the ground in accordance with the present invention. For example, pipeline 10 may be a flexible line which is used to gather produced fluids from remote wells in an arctic environment and which is laid directly on the permafrost or tundra surface 11 which exists in such areas. As illustrated, a plurality of rolling supports 12 and sliding supports 13 are spaced along pipeline 10 to elevate and support the pipeline slightly above the surface of the tundra. This allows water from rains, thaws, etc. to flow under the pipeline 10 thereby preventing serious erosion or subsidence problems which might otherwise occur if a pipeline blocked such flow. Further, the pipeline 10 is elevated at a sufficient height above the tundra 11 (e.g. from about 3 to about 6 inches) to allow small animals (e.g. molting birds) to pass under the line while the pipeline is in operation.

While rolling supports 12 and sliding supports 13 are similar in construction and are interchangeable in many situations, each will be described in detail. Each of rolling supports 12 (FIGS. 3 and 4) is comprised of a cylindrical shell 14 which is preferably made in two substantially identical halves 14a, 14b for ease of assembly. Supports 12, 13 can be made of any material which is corrosion/erosion resistant and which is strong enough to support pipeline 10 over long periods of time. For example, the supports may be constructed of any of several well known plastics; e.g. high density polyethylene (HDPE); inexpensive acrylonitrile-butadiene-styrene (ABS) polymer, or more expensive polycarbonates. As will be recognized by the art, the supports can be fabricated by any of several, well known technique, e.g. extrusion and vacuum forming.

Shell 14 of rolling support 12, when assembled, has a central bore 15 therethrough which is adapted to receive and support pipeline 10. The diameter of bore 15 is slightly greater than the outside diameter (OD) of pipeline 10; e.g. about ½ to about 1 inch greater that the OD of pipeline 10. The outside diameter of shell 14 will normally be about 6 to about 12 inches greater than the OD of pipeline 10, depending on the size of the pipeline. The length "L" of shell 14 will be from about 4 to about 6 times the OD of pipeline 10.

To assemble support 12 onto pipeline 10, the two halves 14a, 14b are positioned around pipeline 10 with the pipeline being received in central bore 15. As shown, each half has a pair of diametrically-opposed recesses 16 therein which, in turn, have openings therethrough which align when the halves are properly positioned. A securing means, e.g. bolt 17 or the like, is passed through the aligned openings and secures the two halves together. While only one securing means is shown on each side of shell 14, it should be recognized that more than one set of securing means 17 can be used on each side if the situation dictates. Further, it should be recognized that other securing means can be used without departing from the present invention. For example, halves 14a, 14b can be hinged together along one side with the other side being secured by a bolt(s) or the like once the shell 14 is in position around the pipeline 10. Likewise, bands (not shown) of a durable material; e.g. stainless steel) can be wrapped around the two halves to hold them together. Still further, adhesives may be used to secure the halves together or welding if the supports are constructed from certain metals; e.g. aluminum.

Figure 3:
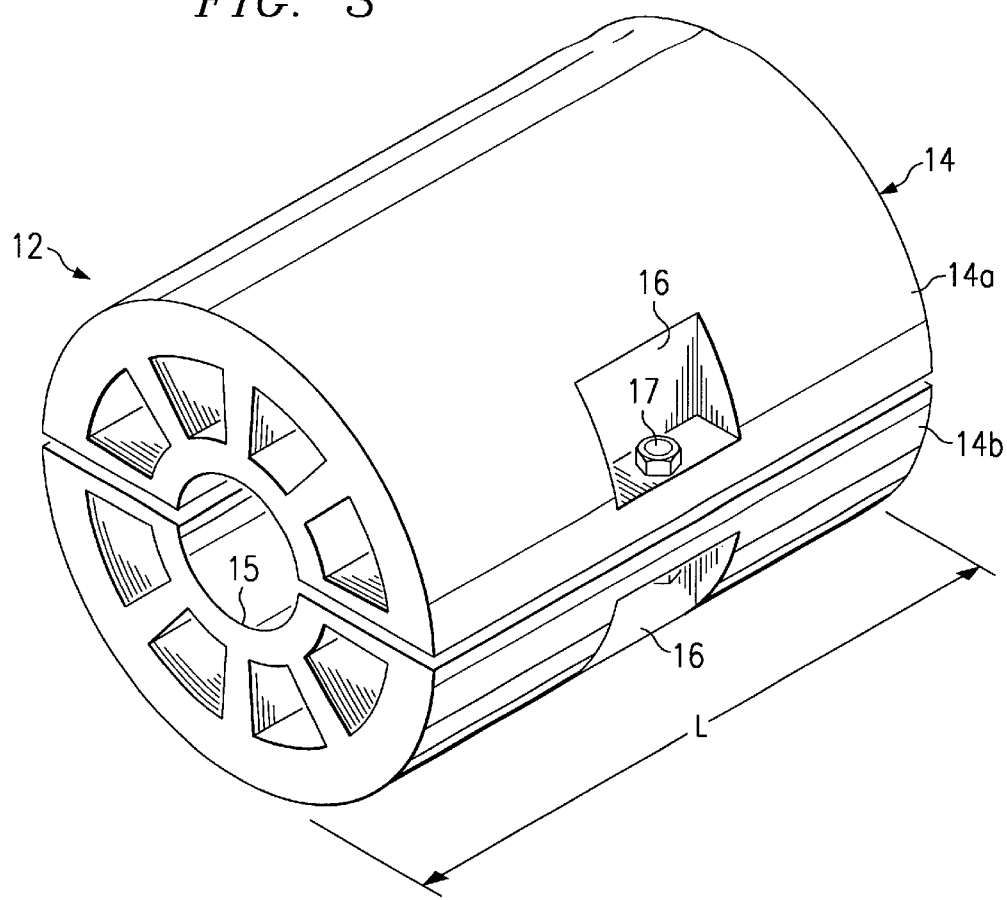
FIG. 3 is a perspective view of a support of the present invention.
Figure 4:
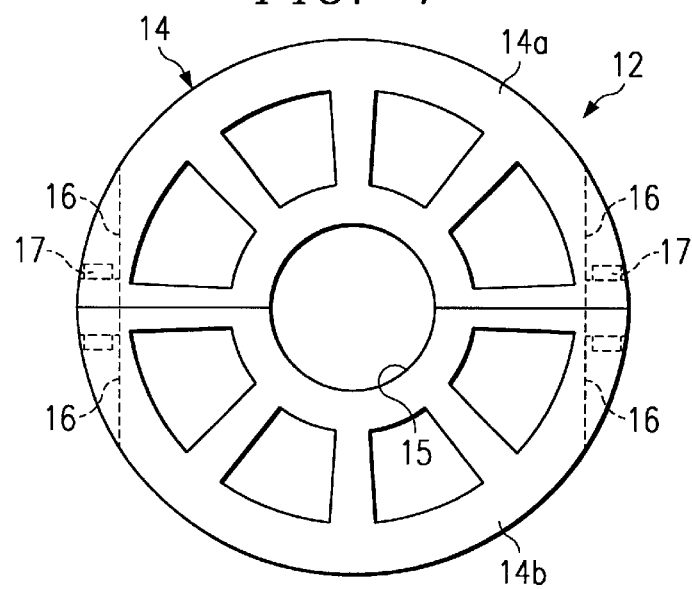
FIG. 4 is an end view of the support of FIG. 3.

By recessing the securing means 17, as shown in FIGS. 3 and 4, the supports are free to roll on the tundra when the pipeline moves laterally due to temperature expansion/contraction or pressure surges which might occur during operation. Also, since the bore 15 through support 12 is larger than the OD of pipeline 10, the pipeline is also free to move longitudinally with respect to support 12 without requiring the support to move thereby preventing binding between the support and the pipeline or scrapping of the tundra by the support.

Figure 5:
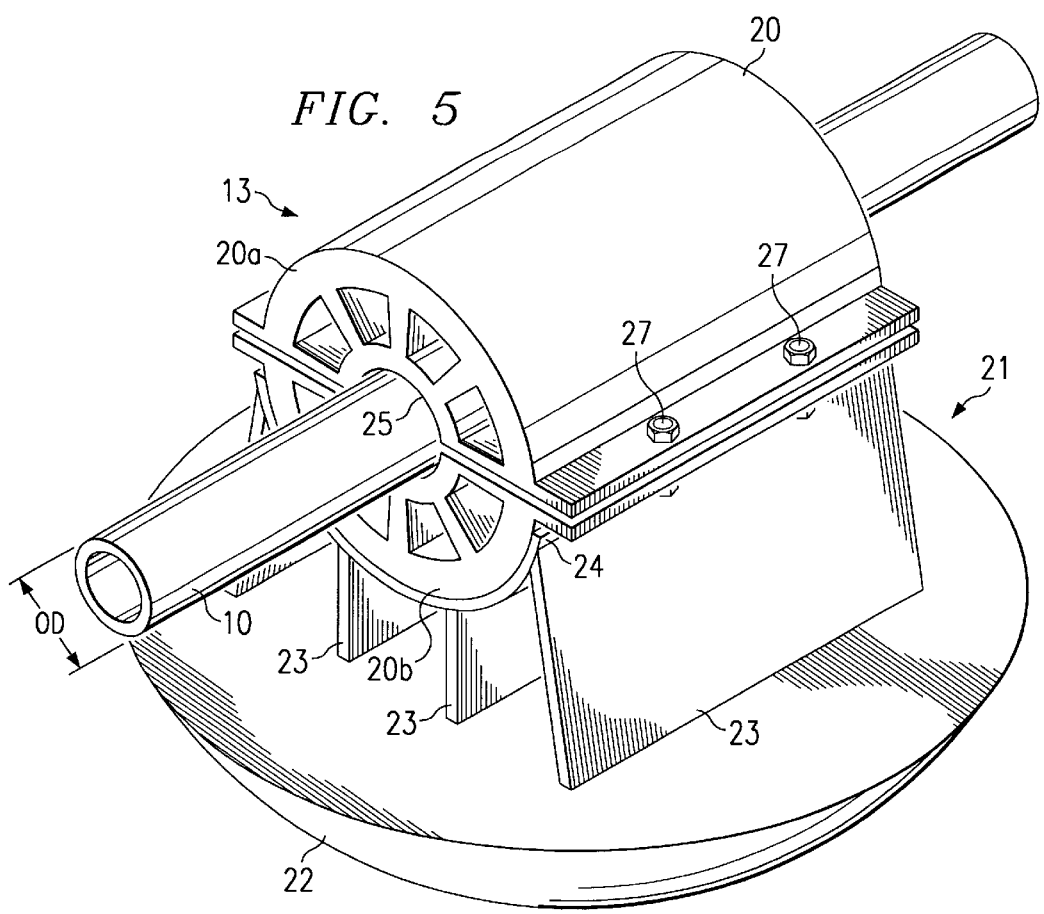
FIG. 5 is a perspective view of a further embodiment of a support of the present invention as installed on a pipeline.
Figure 6:
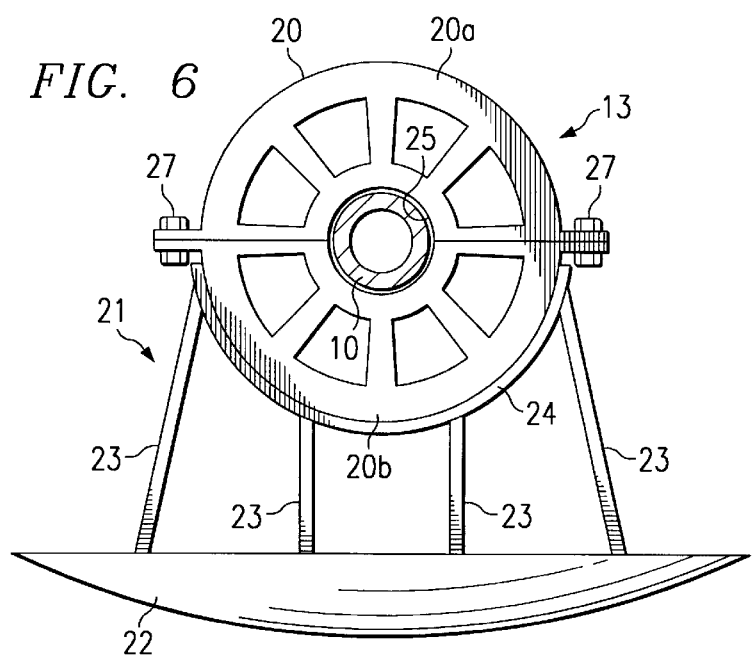
FIG. 6 is an end view of the support of FIG. 5.

Sliding support 13 (FIGS. 5 and 6) is similar to rolling support 12 in that it is comprised of a cylindrical shell 20 of basically the same dimensions as those of shell 14 but differs therefrom in that shell 20 is mounted on sliding stand 21. Stand 21 is comprised of a saucer-like, partial-spherical base 22 and a plurality of vertical plates 23 affixed thereto. A cylindrical cradle 24 is attached to the upper ends of plates 23 and is adapted to receive shell 20. The respective plates will be long enough to elevate pipeline a sufficient distance (e.g. from about 3 to about 6 inches) above tundra 11.

Shell 20 is preferably comprised of two halves 20a, 20b which form a central bore 25 therethrough when secured about pipeline 10. Shell 20 may be made as a separate component which is positioned and affixed into cradle 24 after the shell has been assembled around pipeline 10 or the lower half 20b of shell 20 can be integrated/secured into stand 21 to form a one-piece component. In the latter case, pipeline 10 would be laid into the lower half 20b on stand 21 and upper half 20a would then be secured thereto by bolts 27 or the like.

Further, central bore 21 may be substantially the same size as the OD of pipeline 10 (i.e. only slightly larger) whereby shell 20 will be clamped onto the pipe to effective secure the pipe to the support when shell 20 is assembled. By clamping the pipeline 10 to sliding support, the position of pipeline 10 can be better maintained during operation. However, since the spherical surface of base 24 of stand 22 is in contact with the tundra 11 at only one tangential point, the pipe can move in any direction when affected by temperature/pressure changes within the pipe. That is, the stand can rock from side-to-side or easy slide along the tundra as the case may be without doing any damage to the tundra.

In constructing pipeline 10, a plurality of supports are assembled onto the pipeline at spaced intervals; e.g. from about 20 to about 40 feet apart, depending on the diameter of pipeline 10. The size of the supports and their spacing will be such that most of pipeline 10 will be elevated at a sufficient height above the surface of tundra 11 whereby both water and/or small animals can pass under the line.

What is claimed is:

1. A pipeline for conveying fluids, said pipeline comprising:
   a length of pipe; and
   a plurality of movable supports positioned around said pipeline at spaced intervals, at least one of said movable supports being a rolling support, said rolling support comprising:
      a cylindrical shell having a central, cylindrical bore therethrough adapted to receive said pipe wherein the diameter of said central bore is larger than the outside diameter of said pipe whereby only a portion of the outer surface of said pipeline contacts said central bore so that said pipe is free to move longitudinally with respect to said cylindrical shell, said cylindrical shell being adapted to lie directly on said surface of the earth and adapted to be free to roll laterally with respect to said surface.

2. The pipeline of claim 1 wherein said cylindrical shell is comprised of two substantially identical halves which are adapted to be secured around said pipe.

3. The pipeline of claim 2 wherein said two halves of said cylindrical shell is comprised of plastic.

4. The pipeline of claim 1 wherein at least one of said movable supports is a sliding support, said sliding support comprising:
   a slidable stand comprising:
      a saucer-like, partial-spherical base adapted to be positioned in movable contact with said surface of the earth; and a plurality of substantially vertical members affixed to and extending upward from said base; and a cylindrical shell having a central bore therethrough adapted to receive said pipe; said cylindrical shell being positioned on and supported by said substantially vertical members on said base.

5. The pipeline of claim 4 wherein said cylindrical shell is comprised of two substantially identical halves which are adapted to be secured around said pipe.

6. The pipeline of claim 5 wherein the diameter of said central bore is substantially equal to the outside diameter of said pipe whereby said pipe will be clamped within said central bore when said halves of said cylindrical shell are assembled around said pipe whereby said pipe is prevented from moving longitudinally with respect to said cylindrical shell.

7. A movable support for a pipeline comprising:

a cylindrical shell adapted to be movable with respect to the surface of the earth, said shell comprising;

two substantially identical halves, said halves having a central bore formed therebetween when said halves are assembled together, said central bore adapted to receive said pipeline wherein the diameter of said central bore is larger than the outside diameter of said pipeline whereby only a portion of the outer surface of said pipeline contacts said central bore so that said pipeline is free to move longitudinally with respect to said cylindrical shell, said cylindrical shell being adapted to lie directly on said surface of the earth and adapted to be free to roll laterally with respect to said surface; and means for securing said halves together once they have been positioned around said pipeline.

8. The movable support of claim 7 wherein said means for securing said halves together comprises:

a pair of diametrically-opposed recesses in each of said halves; each recess having an opening therethrough wherein an opening through one half of said cylindrical shell aligns with a respective opening in the other half of said cylindrical shell when said halves are positioned together; and a securing means passing through said respective aligned openings to secure said halves together whereby said securing means offers no resistance to the rotation of said cylindrical shell on the the surface.

* * * * *